United States Patent
Fujii et al.

(10) Patent No.: US 12,438,021 B2
(45) Date of Patent: Oct. 7, 2025

(54) SEMICONDUCTOR MANUFACTURING APPARATUS AND PROCESSING METHOD OF SEMICONDUCTOR MANUFACTURING APPARATUS

(71) Applicant: Tokyo Electron Limited, Tokyo (JP)

(72) Inventors: Hiromichi Fujii, Hokkaido (JP); Takashi Kunieda, Hokkaido (JP)

(73) Assignee: TOKYO ELECTRON LIMITED, Tokyo (JP)

( * ) Notice: Subject to any disclaimer, the term of this patent is extended or adjusted under 35 U.S.C. 154(b) by 265 days.

(21) Appl. No.: 17/989,870

(22) Filed: Nov. 18, 2022

(65) Prior Publication Data

US 2023/0170235 A1 Jun. 1, 2023

(30) Foreign Application Priority Data

Nov. 26, 2021 (JP) ................. 2021-191717

(51) Int. Cl.
*H01L 21/67* (2006.01)
*G05B 19/418* (2006.01)

(52) U.S. Cl.
CPC .... *H01L 21/67276* (2013.01); *G05B 19/4183* (2013.01); *H01L 21/67011* (2013.01)

(58) Field of Classification Search
CPC ...... G05B 2219/45031; G05B 19/4183; G05B 15/00; G05B 2219/00; H01L 21/67011; H01L 21/67276; Y02P 90/02
See application file for complete search history.

(56) References Cited

U.S. PATENT DOCUMENTS

| | | | | |
|---|---|---|---|---|
| 5,854,636 A | * | 12/1998 | Watanabe | G11C 7/1006 345/545 |
| 2006/0052897 A1 | * | 3/2006 | Liao | G05B 15/02 700/100 |
| 2009/0198368 A1 | * | 8/2009 | Shimatani | G06Q 50/04 700/95 |
| 2010/0031264 A1 | * | 2/2010 | Ito | G06F 9/5038 700/121 |

(Continued)

FOREIGN PATENT DOCUMENTS

| | | |
|---|---|---|
| JP | 2004259030 A | 9/2004 |
| JP | 2008-212539 A | 9/2008 |

(Continued)

*Primary Examiner* — Kidest Bahta
(74) *Attorney, Agent, or Firm* — Venjuris, P.C.

(57) ABSTRACT

A semiconductor manufacturing apparatus includes: an execution instruction receiving unit that receives an execution instruction for the semiconductor manufacturing apparatus to execute a predetermined process related to an operation control of the semiconductor manufacturing apparatus; an identification information receiving unit that receives an input of identification information of the semiconductor manufacturing apparatus; and an execution unit that executes the predetermined process according to the execution instruction of the predetermined process when identification information of the semiconductor manufacturing apparatus preset in the semiconductor manufacturing apparatus is the same as the identification information of the semiconductor manufacturing apparatus received by the identification information receiving unit.

11 Claims, 14 Drawing Sheets

(56) References Cited

U.S. PATENT DOCUMENTS

| | | | | |
|---|---|---|---|---|
| 2010/0036517 A1* | 2/2010 | Takizawa | ........... | G05B 19/0428 |
| | | | | 700/110 |
| 2014/0065732 A1* | 3/2014 | Okada | ..................... | H01L 22/20 |
| | | | | 156/345.13 |
| 2015/0139218 A1* | 5/2015 | Cumeralto | ................ | H04L 1/20 |
| | | | | 370/350 |

FOREIGN PATENT DOCUMENTS

| | | | |
|---|---|---|---|
| JP | 2010120322 A | 6/2010 | |
| JP | 2012174763 A | 9/2012 | |
| KR | 100502101 B1 | 10/2005 | |

* cited by examiner

| RESERVATION ACCEPTANCE DATE AND TIME | RESERVATION CONTENTS |
|---|---|
| 2021/××/×× | SHUTDOWN |

SEMICONDUCTOR MANUFACTURING APPARATUS AND PROCESSING METHOD OF SEMICONDUCTOR MANUFACTURING APPARATUS

CROSS-REFERENCE TO RELATED APPLICATION

This application is based on and claims priority from Japanese Patent Application No. 2021-191717 filed on Nov. 26, 2021 with the Japan Patent Office, the disclosure of which is incorporated herein in its entirety by reference.

TECHNICAL FIELD

The present disclosure relates to a semiconductor manufacturing apparatus and a processing method of the semiconductor manufacturing apparatus.

BACKGROUND

Japanese Patent Laid-Open Publication No. 2008-212539 discloses a technology in which when a shutdown operation is performed in a medical diagnostic device, a shutdown execution whether to continue the shutdown operation is displayed on a display in order to call an operator's attention and suppress an erroneous operation of the device. Many semiconductor manufacturing apparatuses are in operation in a semiconductor manufacturing factory, and many of the same model are lined up.

SUMMARY

According to the present disclosure, a semiconductor manufacturing apparatus includes: an execution instruction receiving unit that receives an execution instruction for the semiconductor manufacturing apparatus to execute a predetermined process related to an operation control of the semiconductor manufacturing apparatus; an identification information receiving unit that receives an input of identification information of the semiconductor manufacturing apparatus; and an execution unit that executes the predetermined process according to the execution instruction of the predetermined process when identification information of the semiconductor manufacturing apparatus preset in the semiconductor manufacturing apparatus is the same as the identification information of the semiconductor manufacturing apparatus received by the identification information receiving unit.

According to the present disclosure, a semiconductor manufacturing apparatus executes a predetermined process related to an operation control of the semiconductor manufacturing apparatus according to an operation by a worker. The semiconductor manufacturing apparatus includes: at least two or more operation receiving units disposed at a certain distance or more from the semiconductor manufacturing apparatus; and an execution unit that executes the predetermined process on the semiconductor manufacturing apparatus when detecting that the two operation receiving units have been operated in an overlapped time period.

According to the present disclosure, a semiconductor manufacturing apparatus includes: an execution instruction receiving unit that receives an execution instruction for the semiconductor manufacturing apparatus to execute a predetermined process related to an operation control of the semiconductor manufacturing apparatus; a reservation information storage unit that stores reservation information of the predetermined process; and an execution unit that, when the reservation information is maintained in the reservation information storage unit, executes the predetermined process on the semiconductor manufacturing apparatus according to the execution instruction of the predetermined process.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
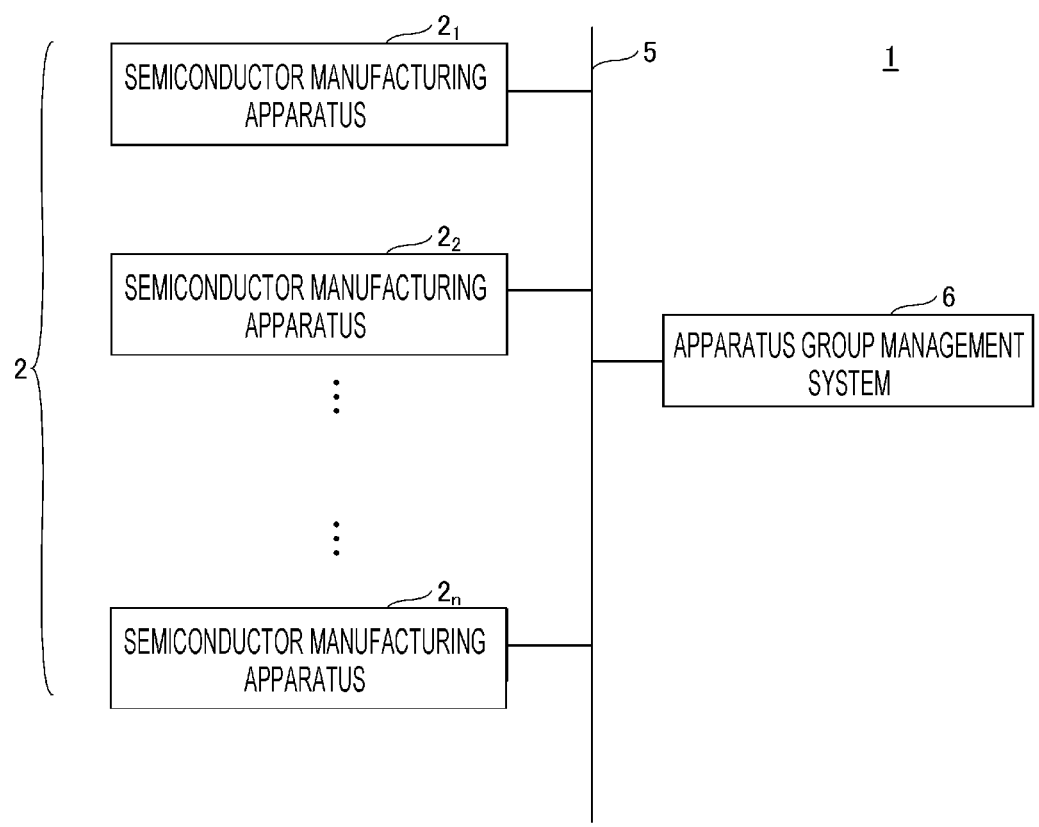
FIG. 1 is a schematic configuration diagram of a processing system including a semiconductor manufacturing apparatus and an apparatus group management system.

In the following detailed description, reference is made to the accompanying drawings, which form a part thereof. The illustrative embodiments described in the detailed description, drawings, and claims are not meant to be limiting. Other embodiments may be utilized, and other changes may be made without departing from the spirit or scope of the subject matter presented here.

Hereinafter, non-limiting embodiments of the present disclosure will be described with reference to the accompanying drawings. As an example of a mode for practicing the present disclosure, a method for executing processing in a semiconductor manufacturing apparatus will be described with reference to the drawings.

[Turning off Semiconductor Manufacturing Apparatus]

A semiconductor manufacturing apparatus continuously produces substrates such as wafers for 24 hours. For this reason, the semiconductor manufacturing apparatus is shut down according to the schedule even when work such as hardware or software update or periodic maintenance is required. The term "shutdown" refers to a power state where the above works may be performed (e.g., a power-off state). A worker directly operates and shut down the semiconductor manufacturing apparatus. However, since there are many semiconductor manufacturing apparatuses in operation in a semiconductor manufacturing factory, and many of the same models are lined up, it may be a factor that the semiconductor manufacturing apparatus to be operated, that is, the semiconductor manufacturing apparatus that requires work (i.e., shutdown) is mistaken.

When a worker shuts down a semiconductor manufacturing apparatus that does not need to be shut down, the manufacturing schedule may need to be revised, or certain substrates may not be shipped, resulting in a large loss.

Therefore, in the present embodiment, the following three methods are used to suppress workers from shutting down the semiconductor manufacturing apparatus that does not need to be shut down. In other words, only the semiconductor manufacturing apparatus that needs to be shut down is shut down. Hereinafter, the methods will simply be referred to as "suppressing the mistake of semiconductor manufacturing apparatuses."

(i) When the semiconductor manufacturing apparatus requests the input of a pre-registered apparatus name and the pre-registered apparatus name is input, a shutdown is performed.

When a worker believes that the semiconductor manufacturing apparatus is to be shut down (actually, the apparatus is not to be shut down), simply displaying a confirmation message at the time of shutting down does not allow the worker to notice that the semiconductor manufacturing apparatus is mistaken. In this way, by requesting the input of the apparatus name registered in advance, the semiconductor manufacturing apparatus to be shut down may be shut down without being mistaken by the worker.

(ii) Operation receiving units (e.g., hardware switches) are provided on the front and rear surfaces of the semiconductor manufacturing apparatus, and when the operation receiving units of both the front and rear surfaces are pressed, a shutdown operation is received. The front surface and the rear surface are examples of arrangement locations for hardware switches that are separated by a certain distance or more and need to be operated by two or more people.

Even when an operation rule is established that two people need to work while confirming the shutdown, the operation rule may not be enforced because only one person operates the semiconductor manufacturing apparatus. In this way, the present disclosure may enforce an operation rule in which two people work while checking each other by providing a mechanism for two people to perform a shutdown operation.

(iii) A semiconductor manufacturing apparatus to be shut down is reserved from an apparatus group management system (to be described later) and in the case of a semiconductor manufacturing apparatus for which shutdown has been reserved, the shutdown is performed.

When an administrator instructs the worker to shut down, there is a possibility that the target semiconductor manufacturing apparatus may be erroneously communicated. In this way, by confirming that the shutdown has been reserved, the semiconductor manufacturing apparatus may suppress occurrence of confusion due to miscommunication.

[Terms]

The predetermined process related to the operation control of the semiconductor manufacturing apparatus is a process of changing from an operating state where the semiconductor manufacturing apparatus may perform its original operation such as process control to a state where the semiconductor manufacturing apparatus may not perform its original operation. For example, when the power is turned off, at least the semiconductor manufacturing apparatus is in a state where the semiconductor manufacturing apparatus may not perform its original operations such as process control. Turning off the power also means putting an operating state where hardware or software updates or periodic maintenance work may be performed. Turning off the power is, for example, a state where power is not supplied from a power tap. In the present embodiment, turning off the power may be referred to as shutdown.

In the present embodiment, a method for suppressing the mistaken selection of the semiconductor manufacturing apparatus 2 to be shut down will be described, but the method may also be used to suppress, for example, the mistaken selection of the semiconductor manufacturing apparatus 2 to be restarted. The term "restart" refers to first terminating the software operating in the apparatus and starting the software again. There are two types of restarting: one of restarting the software until the power is turned off; and another of terminating and starting only the software while the power is turned on. In addition, for the purpose of suppressing the mistaken selection of the semiconductor manufacturing apparatus 2, not only part replacement, maintenance, and moving accompanied by turning off the power, but also start and arbitrary button operation may be included.

[System Configuration Example]

FIG. 1 is a schematic configuration diagram of a processing system 1 including a semiconductor manufacturing apparatus 2 and an apparatus group management system 6. As illustrated in FIG. 1, the processing system 1 of the present disclosure includes a plurality of semiconductor manufacturing apparatuses 2 ($2_1$ to $2_n$ in FIG. 1), an apparatus group management system 6, and a network 5 interconnecting the elements.

The semiconductor manufacturing apparatus 2 is disposed, for example, in a clean room, and an administrator controls the semiconductor manufacturing apparatus 2 by operating the apparatus group management system 6 in a separate room. For example, the apparatus group management system 6 accepts the input of a recipe (an instruction specifying processing conditions and procedures) and transmits the recipe to the semiconductor manufacturing apparatus 2. A worker enters the clean room and performs "machine operations" such as transferring substrates to be processed, executing recipes for the semiconductor manufacturing apparatus 2, and operating various buttons.

The semiconductor manufacturing apparatus 2 may include various apparatuses according to the process. For example, a film forming apparatus for forming a thin film on a semiconductor wafer, an oxidizing apparatus for oxidizing the surface region of a semiconductor wafer, a diffusion apparatus for diffusing (doping) impurities into the surface region of a semiconductor wafer, an annealing apparatus, and an etching apparatus may be included. Also, the semiconductor manufacturing apparatus 2 may be an apparatus that processes substrates using plasma. Such an apparatus includes an atomic layer deposition (ALD) apparatus, a capacitively coupled plasma (CCP), an inductively coupled plasma (ICP), a radial line slot antenna (RLSA), an electron cyclotron resonance plasma (ECR), and a helicon wave plasma (HWP), and may be applied to any type of apparatus.

Figure 2:
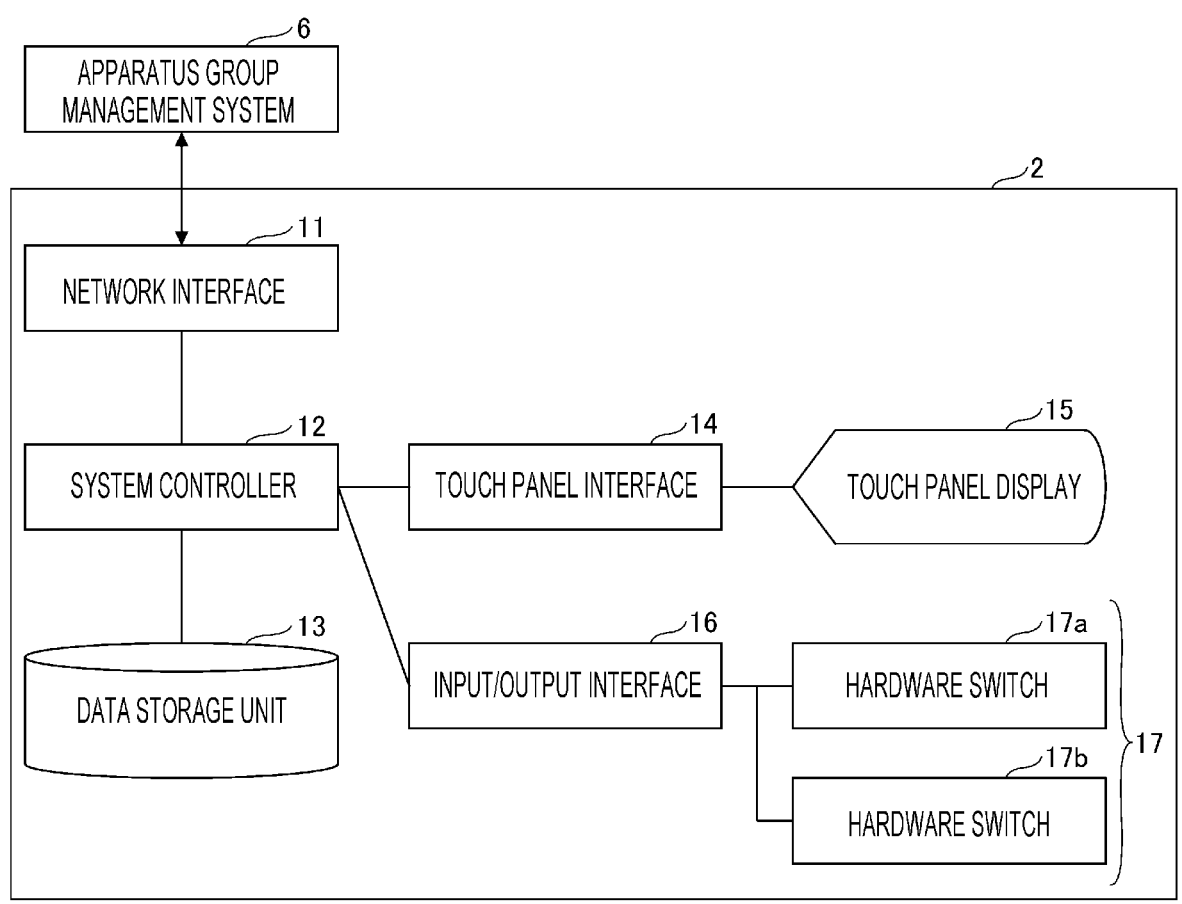
FIG. 2 is a hardware configuration diagram of the semiconductor manufacturing apparatus.

FIG. 2 is a hardware configuration diagram of the semiconductor manufacturing apparatus 2. In FIG. 2, the functions related to the semiconductor manufacturing process are omitted. The semiconductor manufacturing apparatus 2 includes a network interface 11, a system controller 12, a data storage unit 13, a touch panel interface 14, a touch panel display 15, an input/output interface 16, and at least two hardware switches 17a and 17b. An arbitrary hardware switch among the hardware switches 17a and 17b is referred to as a "hardware switch 17."

The network interface 11 is a network interface card (NIC) such as an Ethernet card (registered trademark). The network interface 11 connects to a network 5 to enable communication with the apparatus group management system 6.

The system controller 12 is a microcontroller having a CPU, a RAM, and a ROM, a system on a chip (SoC), or a system in a package (SiP). The system controller 12 performs an entire control necessary for film formation, such as a temperature, pressure, exhaust, processing gas injection, and substrate replacement, according to the recipe. In the present embodiment, the system controller 12 performs a control regarding shutdown.

The touch panel interface 14 converts a signal from the touch panel display 15 into a pressed coordinate or a button pressed on the screen, and notifies the converted signal to the system controller 12. A touch panel is an electronic component that combines a display device such as a liquid crystal panel and a position input device such as a touch pad, and is an input device that operates a device by pressing a display on the screen.

The input/output interface 16 converts the state (on, off) of the hardware switch 17 into a signal and notifies the converted state to the system controller 12. The hardware switch 17 is, for example, a momentary switch that is turned on when pressed by the worker and turned off by an urging force when released.

The data storage unit 13 is a storage device such as a solid state drive (SSD), a hard disk drive (HDD), or an ROM, and stores various types of data. The data storage unit 13 may be a non-volatile memory but may be volatile.

Embodiment 1

Figure 3:
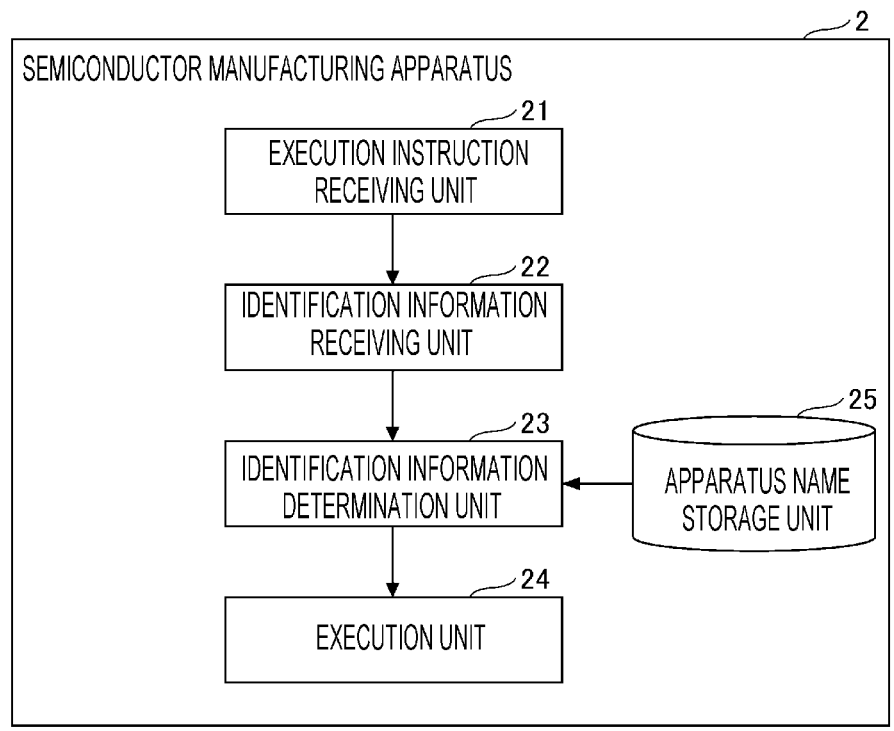
FIG. 3 is a functional configuration diagram of the semiconductor manufacturing apparatus (Embodiment 1).

In the present embodiment, descriptions will be made on the power-off method in the phrase "(i) When the semiconductor manufacturing apparatus requests the input of a pre-registered apparatus name and the pre-registered apparatus name is input, a shutdown is performed."
[Functions]
FIG. 3 is a functional block diagram illustrating functions of the semiconductor manufacturing apparatus 2 of the present embodiment. The semiconductor manufacturing apparatus 2 includes an execution instruction receiving unit 21, an identification information receiving unit 22, an identification information determination unit 23, an execution unit 24, and an apparatus name storage unit 25. The respective functional units of the semiconductor manufacturing apparatus 2 are functions or units that are implemented when the system controller 12 illustrated in FIG. 2 executes instructions included in one or more programs installed in the semiconductor manufacturing apparatus 2.

The execution instruction receiving unit 21 displays a shutdown execution screen (to be described later) on the touch panel display 15, and receives a shutdown execution instruction from the worker. The shutdown execution screen may be displayed on a display other than the touch panel.

The identification information receiving unit 22 displays an apparatus name input screen (to be described later) on the touch panel display 15, and receives the input of the apparatus name by the worker. The apparatus name input screen may be displayed on a display other than the touch panel.

The identification information determination unit 23 determines whether the apparatus name stored in the apparatus name storage unit 25 and the apparatus name received by the identification information receiving unit 22 match. For this reason, the apparatus name storage unit 25 stores individual apparatus names for the semiconductor manufacturing apparatuses 2 in advance. The apparatus name is a combination of letters and numbers that may be easily input by the worker, but the apparatus name also serves as identification information. Therefore, the apparatus name may be any identification information that may identify or specify the semiconductor manufacturing apparatus 2. However, it is not necessarily unique, and the same identification information may be given to several semiconductor manufacturing apparatuses 2 belonging to the group.

Descriptions will be made on a method of storing the apparatus name For example, there is a method in which a worker directly operates the semiconductor manufacturing apparatus 2 to input the apparatus name. Alternatively, since the apparatus group management system 6 communicates with the semiconductor manufacturing apparatus 2, the model number and serial number transmitted from the semiconductor manufacturing apparatus 2 may be displayed, and the administrator may input the apparatus name. Alternatively, the apparatus group management system 6 may assign a unique apparatus name (a combination of numbers and alphabets, etc.) to each semiconductor manufacturing apparatus 2 according to the operation of the administrator. The semiconductor manufacturing apparatus 2 may display its apparatus name on the touch panel display 15. In addition, the apparatus group management system 6 may display the apparatus name transmitted from the semiconductor manufacturing apparatus 2 together with information for identifying the semiconductor manufacturing apparatus 2 such as the model number and serial number. Therefore, the administrator and workers may grasp the apparatus name of the semiconductor manufacturing apparatus 2 to be shut down.

The execution unit 24 shuts down the semiconductor manufacturing apparatus 2. For example, the execution unit 24 confirms whether the heater temperature, pressure, gas injection state, and substrate transfer state are in a state where a shutdown is possible. When such shutdown is possible, the execution unit 24 saves data from the RAM to the SDD, closes the file, terminates the OS process, and finally shuts off the power supply of the semiconductor manufacturing apparatus 2.

[Transition Example of Screen]

Figure 4A:
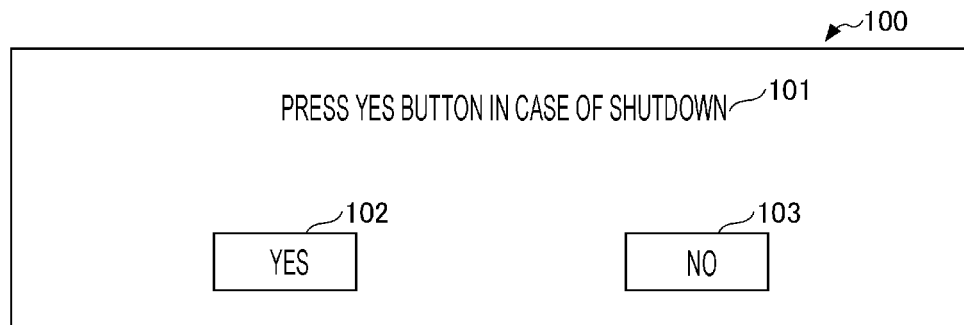
FIGS. 4A to 4C are diagrams illustrating a transition example of a screen displayed on a touch panel display (Embodiment 1).
Figure 4B:
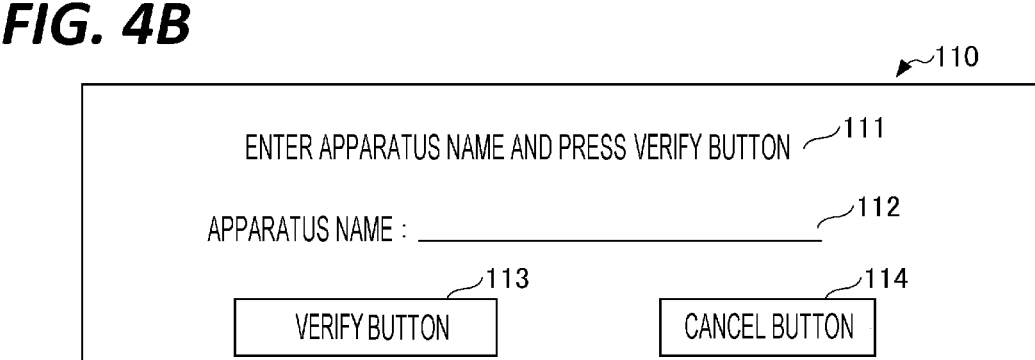
Figure 4C:
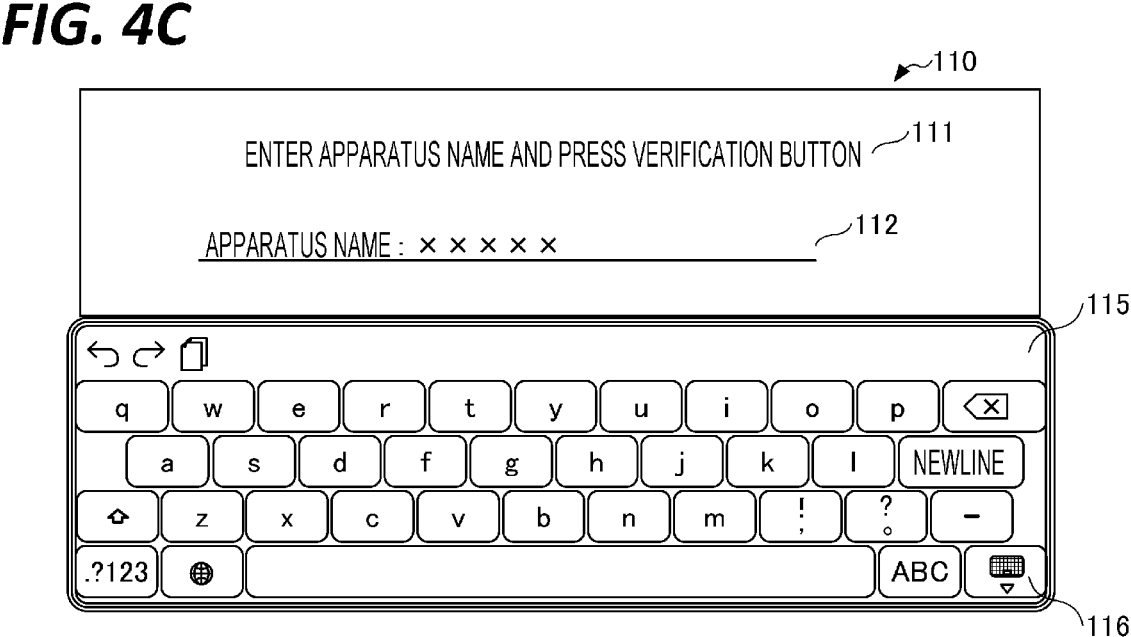

Next, a transition example of a screen displayed on the touch panel display 15 will be described with reference to FIGS. 4A to 4C. FIGS. 4A to 4C are diagrams illustrating a transition example of the screen displayed on the touch panel display 15 at the time of shutdown.

FIG. 4A is an example of a shutdown execution screen 100. The shutdown execution screen 100 is a screen for accepting a shutdown execution instruction. The shutdown execution screen 100 includes a message 101 that reads "Press the Yes button to shut down," a Yes button 102, and a No button 103. When a user presses the Yes button 102, the semiconductor manufacturing apparatus 2 accepts the shutdown execution instruction, and the shutdown execution screen 100 transitions to the apparatus name input screen 110 in FIG. 4B.

FIG. 4B is an example of an apparatus name input screen 110. The apparatus name input screen 110 includes a message 111 that reads "Enter the apparatus name and press the verify button," an apparatus name input field 112, a verify button 113, and a cancel button 114.

The apparatus name input field 112 is a field for inputting the apparatus name of the semiconductor manufacturing apparatus 2 to be shut down by the worker.

The verify button 113 is a button for the worker to request that the semiconductor manufacturing apparatus 2 verify whether the apparatus name stored in the apparatus name storage unit 25 and the apparatus name entered in the apparatus name input field 112 match. When the apparatus names match, a shutdown is performed.

The cancel button 114 is a button for returning to the shutdown execution screen 100.

FIG. 4C is an example of the apparatus name input screen 110 on which a software keyboard 115 is displayed. The software keyboard 115 is displayed when the worker touches the apparatus name input field 112. The worker may operate the software keyboard 115 to input the apparatus name of the semiconductor manufacturing apparatus 2 being instructed.

[Shutdown Procedure]

Figure 5:
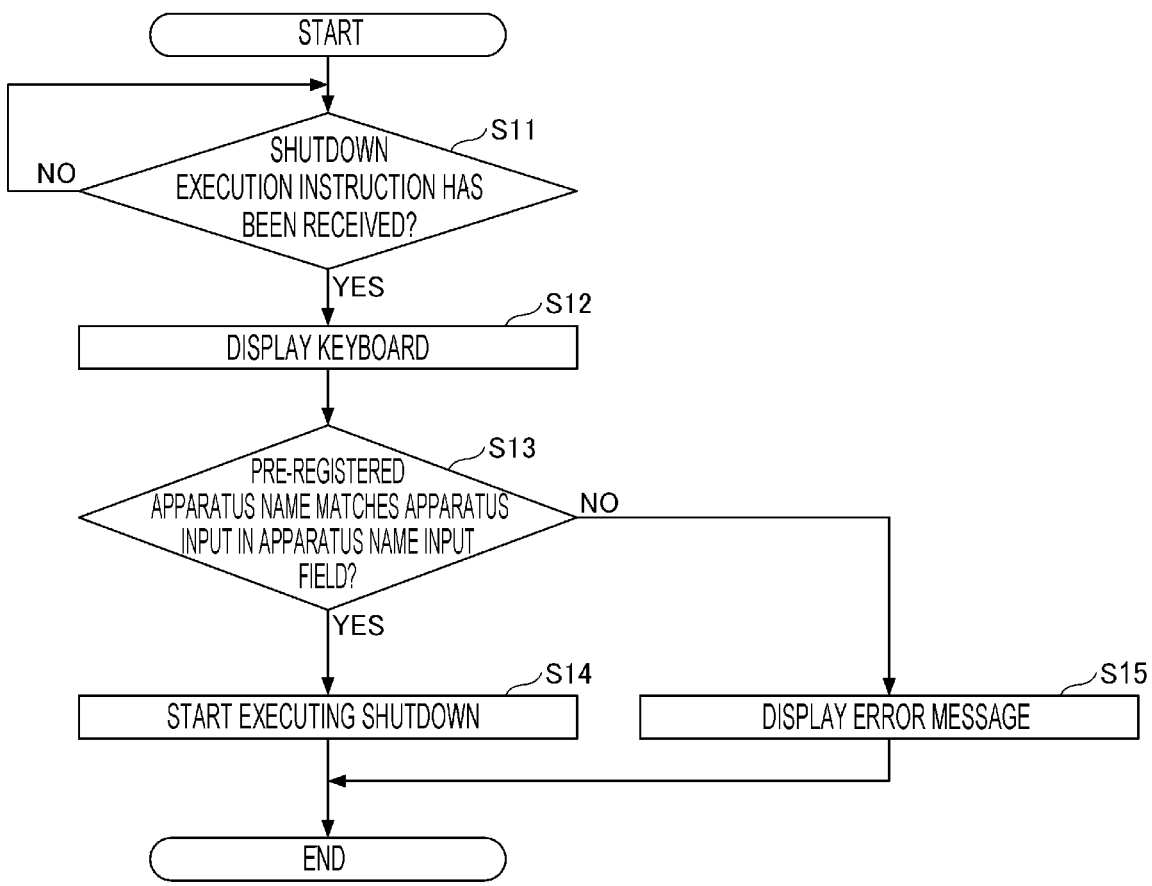
FIG. 5 is a flow chart diagram illustrating a process for shutting down a semiconductor manufacturing apparatus (Embodiment 1).

FIG. 5 is a flow chart diagram illustrating a process for shutting down a semiconductor manufacturing apparatus. Descriptions will be made on a state where the worker displays the shutdown execution screen 100.

First, the execution instruction receiving unit 21 determines whether a shutdown execution instruction has been received (S11). That is, it is determined whether the Yes button 102 has been pressed on the shutdown execution screen 100 of FIG. 4A.

When the determination in step S 11 is "Yes," the identification information receiving unit 22 displays the apparatus name input screen 110 on the touch panel display 15. The worker touches the apparatus name input field 112 to display the software keyboard 115 (S12). The worker operates the software keyboard 115 to input the apparatus name of the semiconductor manufacturing apparatus 2 as instructed by the administrator orally, by e-mail, or on paper. After completing the input, the worker closes the software keyboard 115 with a close button 116 and presses the verify button 113.

By pressing the verify button 113, the identification information determination unit 23 acquires the apparatus name stored in the apparatus name storage unit 25, and determines whether the apparatus name matches the apparatus name input in the apparatus name input field 112 (S13).

When the determination in step S13 is "Yes," the execution unit 24 starts executing the shutdown of the semiconductor manufacturing apparatus 2 according to the execution instruction (S14).

When the determination in step S13 is "No," the identification information receiving unit 22 displays an error message on the touch panel display 15 (S15). The error message may be, for example, "Apparatus names do not match."

In this case, the worker may erase the error message (which may be automatically erased) and operate the software keyboard 115 again to input the apparatus name of the indicated semiconductor manufacturing apparatus 2. When the apparatus names do not match even when the verify button 113 is pressed N times, the identification information receiving unit 22 may prohibit display of the apparatus name input screen 110 for a certain period of time. By doing so, the power-off method of the present disclosure makes it easier to suppress the semiconductor manufacturing apparatus 2 from being mistaken.

[Main Effects]

When the worker believes that the semiconductor manufacturing apparatus 2 is to be shut down (actually, it is not to be shut down), he or she may not notice that the apparatus has been mistaken simply by displaying a confirmation message at the time of shutdown. According to the present embodiment, the semiconductor manufacturing apparatus 2 requests the input of the apparatus name registered in advance before executing shutdown, so that the present disclosure may suppress the semiconductor manufacturing apparatus 2 to be shut down from being mistaken.

Embodiment 2

In the present embodiment, descriptions will be made on the power-off method in the phrase "(ii) Operation receiving units such as hardware switches are provided on the front and rear surfaces of the semiconductor manufacturing apparatus, and when the operation receiving units of both the front and rear surfaces are pressed, a shutdown operation is accepted."

[Arrangement Example of Hardware Switch]

Figure 6:
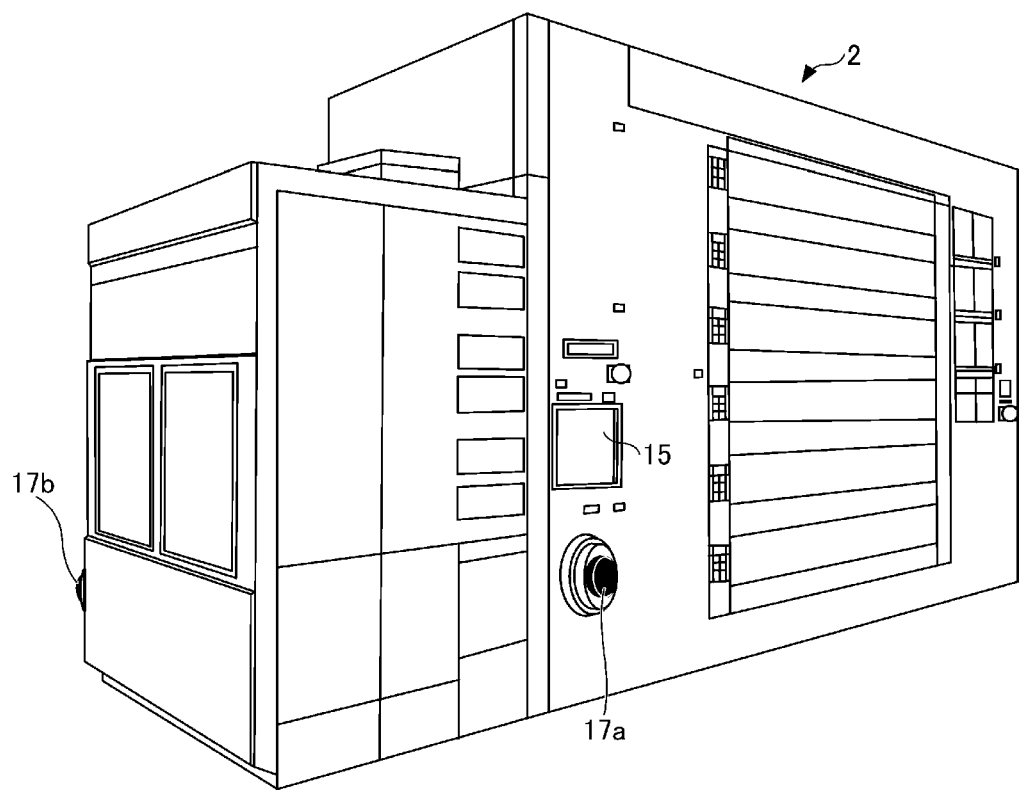
FIG. 6 is a diagram illustrating an example of arrangement of hardware switches (Embodiment 2).

First, an arrangement example of the hardware switches 17 will be described with reference to FIG. 6. FIG. 6 is a diagram illustrating an arrangement example of the hardware switches 17 with respect to an external perspective view of the semiconductor manufacturing apparatus 2. The hardware switches 17a and 17b (an example of two operation receiving units) are disposed at two locations, that is, the front surface and the rear surface of the semiconductor manufacturing apparatus 2. The two hardware switches 17a and 17b are not limited to the front and rear surfaces, and may be separated from each other by at least a distance that a single worker may not press simultaneously (hereinafter, simply referred to as a certain distance or more). Therefore, the hardware switch 17a may be disposed on any of the front surface, the rear surface, the left and right sides, and the top surface, and the hardware switch 17b may be disposed on any of the front surface, the rear surface, the left and right sides, and the top surface, which is different from the hardware switch 17a. However, two hardware switches 17a and 17b may be disposed on the same surface as long as the hardware switches 17a and 17b are separated by a certain distance or more. Therefore, the certain distance may be about 2 m.

Also, one of the two hardware switches 17a and 17b may be disposed near the touch panel display 15. One worker may press the hardware switch 17 while viewing the touch panel display 15. Further, one worker may operate the touch panel display 15 and press the hardware switch 17 at the same time.

Also, both the two hardware switches 17a and 17b may be soft keys displayed on the touch panel display 15. In this case, for example, a touch panel display 15 is provided on the rear surface of the semiconductor manufacturing apparatus 2. Alternatively, one of the two hardware switches 17a and 17b may be the hardware switch 17 and the other may be a soft key displayed on the touch panel display 15. In this case, for example, the hardware switch 17 is disposed on the rear surface of the semiconductor manufacturing apparatus 2.

Further, at least one of the two hardware switches 17a and 17b only needs to have a function of detecting the operation or presence of the worker, and may be a simple touch sensor or ultrasonic sensor without a display. Also, at least one of the two hardware switches 17a and 17b may be an IC card reader. In this case, since the worker holds up the IC card, it is possible to keep a record of the worker who performs the work. The hardware switch 17, soft keys, touch sensor, ultrasonic sensor, and IC card reader are examples of operation receiving units.

The number of hardware switches 17 may be three or more. When three or more workers perform the shutdown work, confusion may be suppressed more reliably.

[Functions]

Figure 7A:
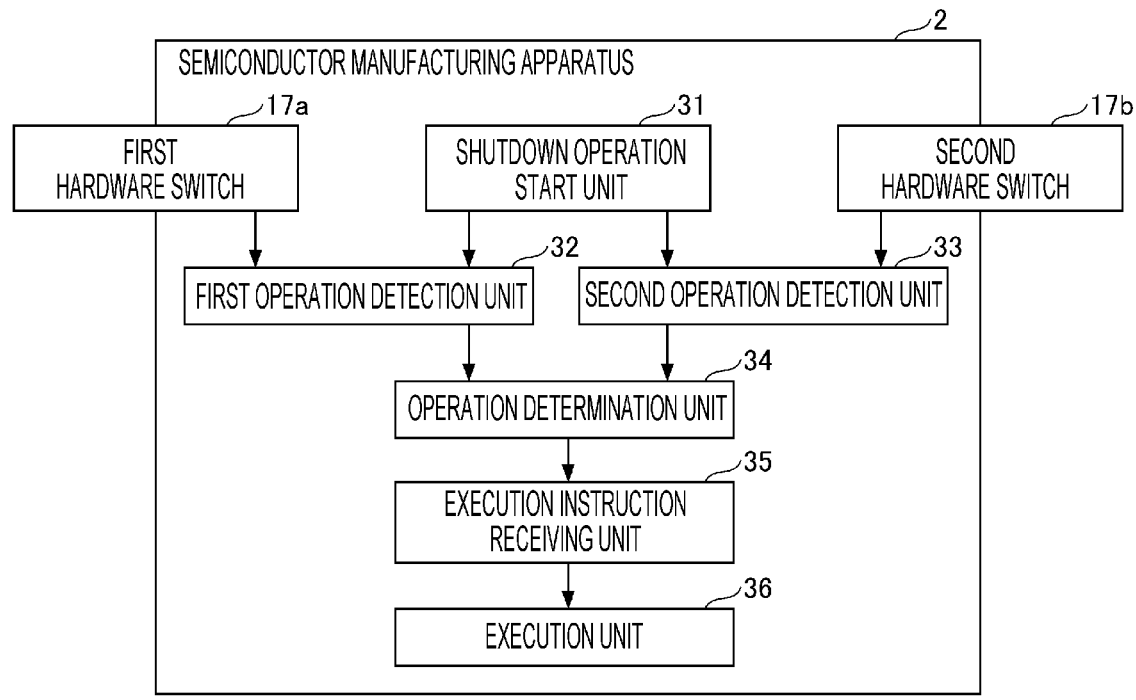
FIGS. 7A and 7B are functional configuration diagrams illustrating functions of a semiconductor manufacturing apparatus (Embodiment 2).
Figure 7B:
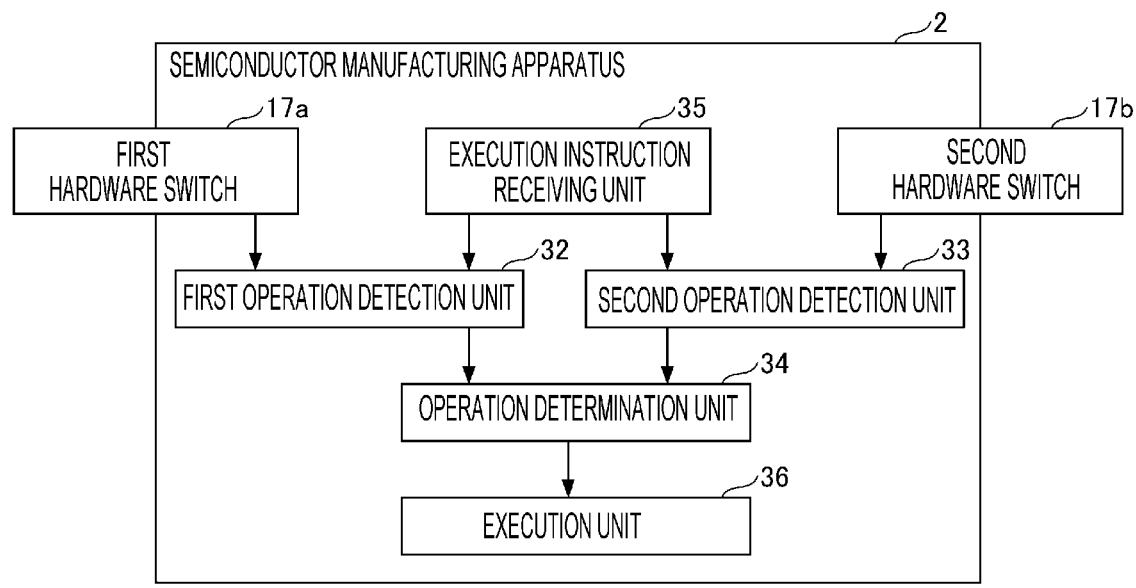

FIGS. 7A and 7B are functional block diagrams illustrating functions of the semiconductor manufacturing apparatus 2 of the present embodiment. The semiconductor manufacturing apparatus 2 of FIG. 7A includes a shutdown operation start unit 31, a first operation detection unit 32, a second operation detection unit 33, an operation determination unit 34, an execution instruction receiving unit 35, and an execution unit 36. The functional units of the semiconductor manufacturing apparatus 2 are functions or units that are implemented when the system controller 12 illustrated in FIG. 2 executes instructions included in one or more programs installed in the semiconductor manufacturing apparatus 2. Although the hardware switch 17a and the hardware switch 17b are hardware configurations, the hardware switches 17a and 17b are illustrated for convenience of explanation.

The shutdown operation start unit 31 displays a shutdown start screen (to be described later) on the touch panel display 15, and receives the start of the shutdown operation according to the worker's operation.

The first operation detection unit 32 detects pressing of the hardware switch 17a, and the second operation detection unit 33 detects pressing of the hardware switch 17b. The first operation detection unit 32 continuously (or repeatedly) outputs an ON signal to the operation determination unit 34 while detecting the pressing of the hardware switch 17a. The second operation detection unit 33 continuously (or repeatedly) outputs an ON signal to the operation determination unit 34 while detecting the pressing of the hardware switch 17b.

The operation determination unit 34 determines whether the first operation detection unit 32 and the second operation detection unit 33 output ON signals overlapping in terms of time. That is, the operation determination unit 34 determines whether both the two hardware switches 17 are pressed.

When the operation determination unit 34 determines that the first operation detection unit 32 and the second operation detection unit 33 output the ON signals overlapping in time, the execution instruction receiving unit 35 displays the shutdown execution screen. Therefore, the execution instruction receiving unit 35 of the present embodiment may receive a shutdown execution instruction when both the two hardware switches 17 are pressed.

The function of the execution unit 36 may be the same as that of Embodiment 1.

A semiconductor manufacturing apparatus 2 in FIG. 7B is a functional configuration diagram according to a modification of Embodiment 2. The function of each functional unit is the same as in FIG. 7A. In the modification, after the execution instruction receiving unit 35 receives the shutdown execution instruction, when the operation determination unit 34 determines that the first operation detection unit 32 and the second operation detection unit 33 output ON signals overlapping in terms of time, the execution unit 36 executes shutdown.

[Transition Example of Screen]

Figure 8A:
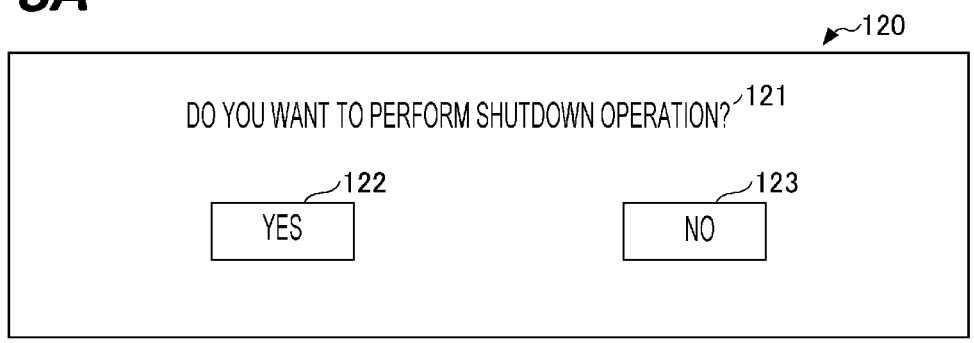
FIGS. 8A to 8C are diagrams illustrating a transition example of a screen displayed on a touch panel display (Embodiment 2).
Figure 8B:
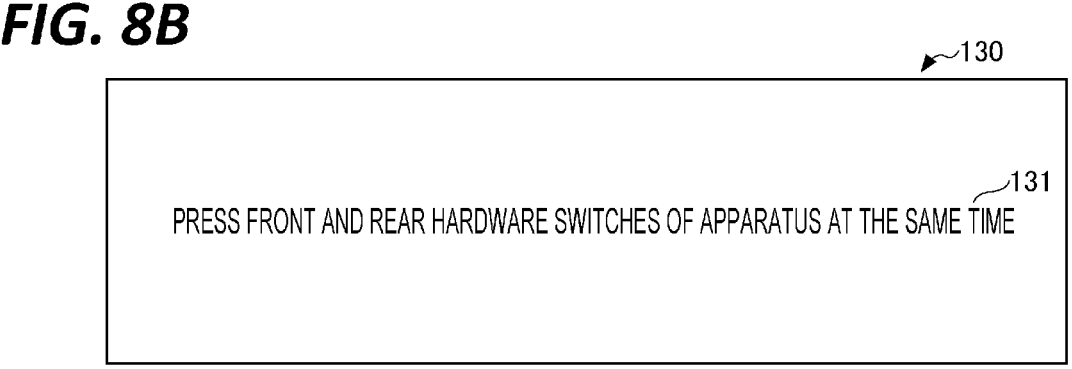
Figure 8C:
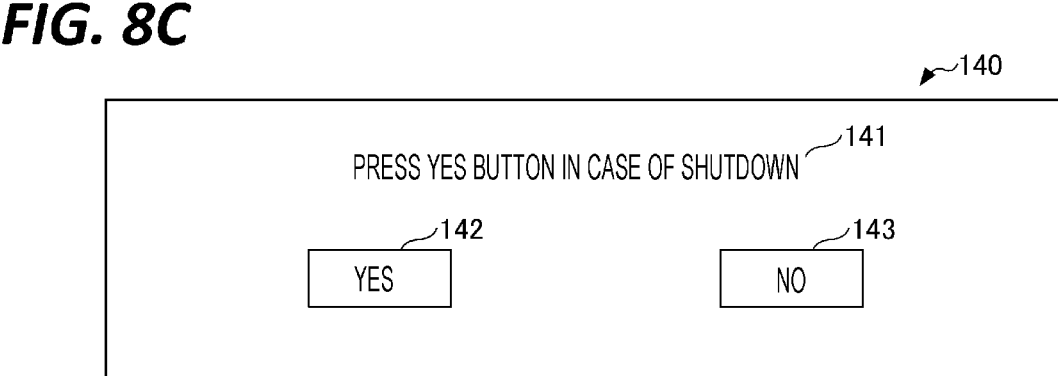

Next, a transition example of a screen displayed on the touch panel display 15 will be described with reference to FIGS. 8A to 8C. FIGS. 8A to 8C are diagrams illustrating a transition example of the screen displayed on the touch panel display 15 at the time of shutdown.

FIG. 8A is an example of a shutdown execution screen 120. The shutdown start screen 120 is a screen for a worker to accept the start of shutdown work. Execution of shutdown is not yet accepted on the screen. The shutdown start screen 120 includes a message 121 that reads "Do you want to perform a shutdown operation?", a Yes button 122, and a No button 123. When the user presses the Yes button 122, the shutdown start screen 120 transitions to the hardware switch pressing prompt screen 130 of FIG. 8B.

FIG. 8B is an example of the hardware switch pressing prompt screen 130. The hardware switch pressing prompt screen 130 includes a message 131 that reads "Press the front and rear hardware switches of the apparatus at the same time." After confirming the message 131, the two workers press the front and rear hardware switches 17a and 17b, respectively. While the hardware switch pressing promotion screen 130 is displayed, the semiconductor manufacturing apparatus 2 may emphasize the hardware switches 17a and 17b by blinking them.

When both the two hardware switches 17a and 17b are pressed, the hardware switch pressing prompt screen 130 transitions to the shutdown execution screen 140.

FIG. 8C is an example of a shutdown execution screen 140. The shutdown execution screen 140 may be similar to that of Embodiment 1. When the user presses the Yes button 142 on the shutdown execution screen 140, the semiconductor manufacturing apparatus 2 accepts a shutdown execution instruction. When the user presses the No button 143, the shutdown execution screen 140 transitions to the shutdown start screen 120.

Since the shutdown execution screen 140 is not displayed unless both the two hardware switches 17a and 17b are pressed, it is possible to suppress a worker from taking the wrong semiconductor manufacturing apparatus 2.

The shutdown execution screen 140 may be displayed only while both the two hardware switches 17a and 17b are pressed. Shutdown may more forcibly implement the operation rule that work is done while checking by two people.

[Shutdown Procedure]

Figure 9:
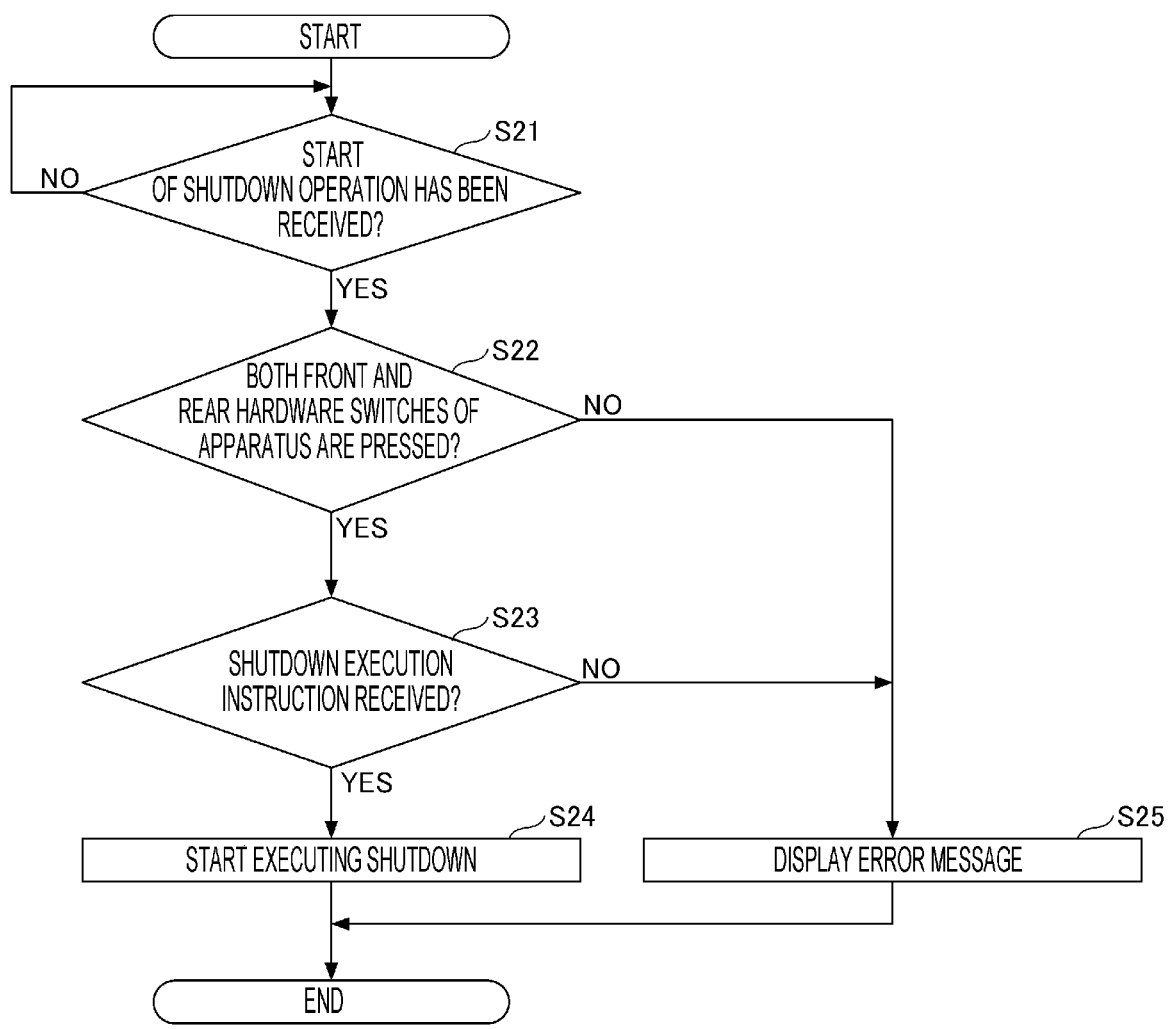
FIG. 9 is a flow chart diagram illustrating a process for shutting down a semiconductor manufacturing apparatus (Embodiment 2).

FIG. 9 is a flow chart illustrating a process of shutting down the semiconductor manufacturing apparatus 2. Descriptions will be made on a state where the worker displays the shutdown start screen 120.

First, the shutdown operation start unit 31 determines whether the start of the shutdown operation has been received (S21). That is, it is determined whether the Yes button 132 has been pressed on the shutdown start screen 120 of FIG. 8A.

When the determination in step S21 is "Yes," the screen transitions to the hardware switch pressing prompt screen 130 of FIG. 8B. Then, the operation determination unit 34 determines whether the first operation detection unit 32 and the second operation detection unit 33 output ON signals overlapping in terms of time (S22). In order to suppress erroneous operations, the operation determination unit 34 may ignore duplicate ON signals within a predetermined period of time.

When the determination in step S22 is "No," the hardware switch pressing prompt screen 130 remains displayed. However, the operation determination unit 34 may display an error message after a certain period of time has elapsed (S25) and return to the main screen (not illustrated) or the shutdown start screen 120. The error message is, for example, "Two hardware switches 17 are not pressed."

When the determination in step S22 is "Yes," the execution instruction receiving unit 35 displays the shutdown execution screen 140 of FIG. 8C, and determines whether the Yes button 142 has been pressed (S23). That is, when both the two hardware switches 17 are pressed, the semiconductor manufacturing apparatus 2 may accept a shutdown execution instruction.

When the determination in step S13 is "Yes," the execution unit 24 starts executing the shutdown of the semiconductor manufacturing apparatus 2 according to the execution instruction (S24).

When the determination in step S23 is "No," the execution unit 36 displays an error message on the touch panel display 15 (S25). First, when the No button 143 is pressed, it is preferable to return to the main screen or the shutdown start screen 120. When neither the Yes button 142 nor the No button 143 is pressed, the shutdown execution screen 140 remains displayed. However, the operation determination unit 34 displays an error message after a certain period of time has passed, and returns to the main screen or the shutdown start screen 120. An example of the error message is "Shutdown was not executed."

<Modification of Operation Procedure>

Figure 10A:
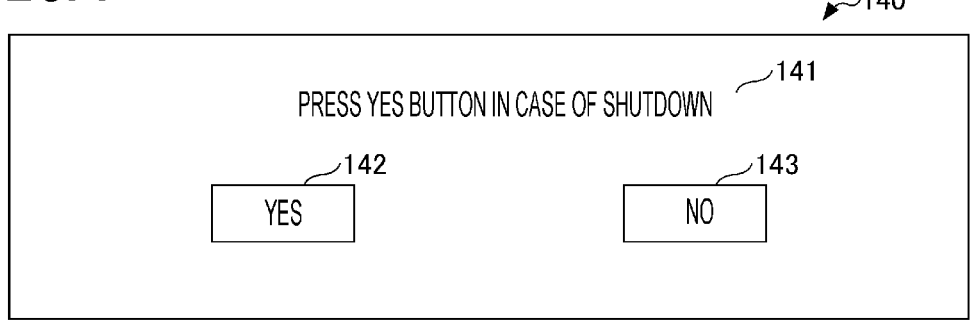
FIGS. 10A and 10B are diagrams illustrating a transition example of a screen displayed on a touch panel display (Modification of Embodiment 2).
Figure 10B:

As illustrated in FIGS. 8A to 9, the procedure of the shutdown operation is not the same procedure as shutdown start screen 120→hardware switch pressing prompt screen 130→shutdown execution screen 140, and may be the same procedure as shutdown execution screen 140→hardware switch pressing prompt screen 130. FIGS. 10A and 10B illustrate the latter screen transition. The shutdown execution screen 140 of FIG. 10A is the same as that of FIG. 8C, and the hardware switch pressing prompt screen 130 of FIG. 10B is the same as that of FIG. 8B.

In this case, when two workers press the hardware switches 17 simultaneously, the shutdown is executed without subsequent button operation.

Figure 11:
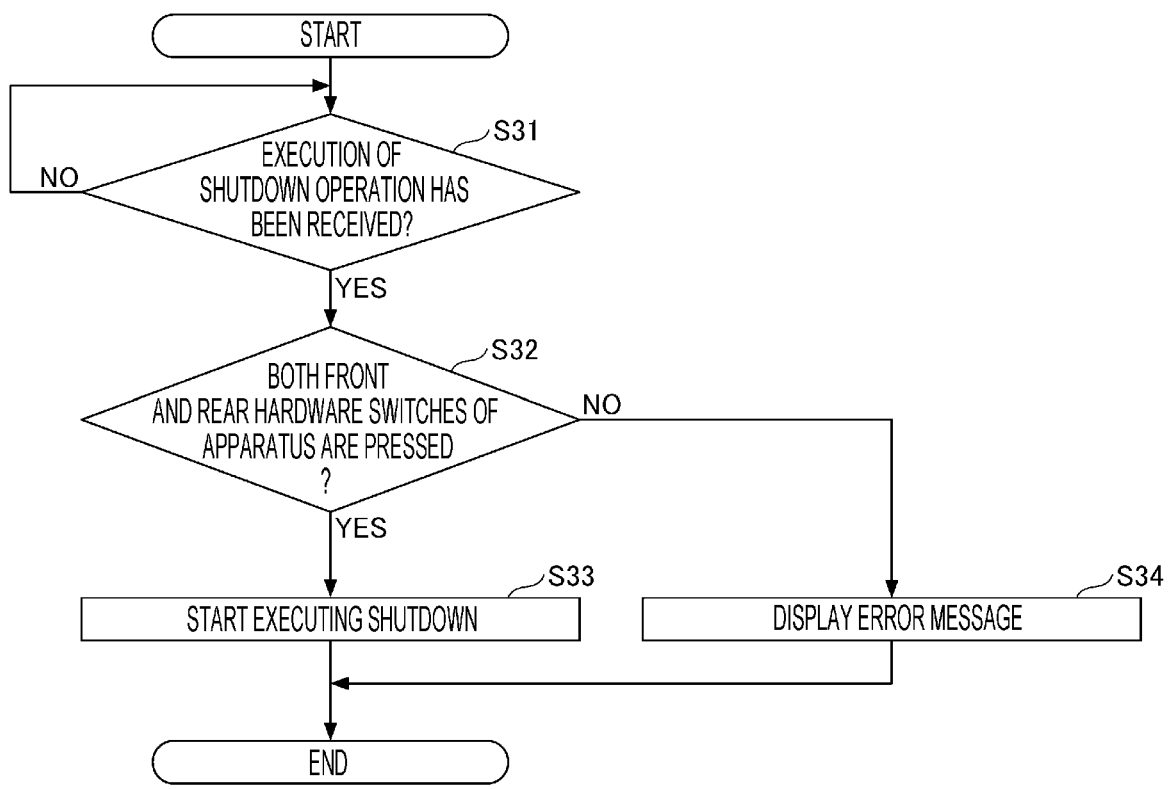
FIG. 11 is a flow chart diagram illustrating a process for shutting down a semiconductor manufacturing apparatus (Modification of Embodiment 2).

FIG. 11 is a flow chart illustrating a process of shutting down the semiconductor manufacturing apparatus 2. Descriptions will be made on a state where the worker displays the shutdown execution screen 140.

First, the execution instruction receiving unit 35 determines whether a shutdown execution instruction has been received (S31). That is, it is determined whether the Yes button 142 has been pressed on the shutdown execution screen 140 of FIG. 10A.

When the determination in step S31 is "Yes," the screen transitions to the hardware switch pressing prompt screen 130 of FIG. 10B. Then, the operation determination unit 34 determines whether the first operation detection unit 32 and the second operation detection unit 33 output ON signals overlapping in terms of time (S32).

When the determination in step S13 is "Yes," the execution unit 24 starts executing the shutdown of the semiconductor manufacturing apparatus 2 according to the execution instruction (S33).

When the determination in step S23 is "No," the execution unit 36 displays an error message on the touch panel display 15 (S34). When the determination in step S22 is "No," the hardware switch pressing prompt screen 130 remains displayed. However, it is preferable to display an error message after a certain period of time has passed, and return to the main screen or the shutdown start screen 140. The error message is, for example, "Two hardware switches 17 are not pressed."

[Main Effects]

According to the present embodiment, by providing a mechanism for two people to perform a shutdown operation, it is possible to enforce an operation rule that two people work while checking each other.

Embodiment 3

In the present embodiment, descriptions will be made on the power-off method in the phrase "(iii) A semiconductor manufacturing apparatus to be shut down is reserved from an apparatus group management system (to be described later) and in the case of a semiconductor manufacturing apparatus for which shutdown has been reserved, the shutdown is performed."

[Functions]

Figures 12, 13:
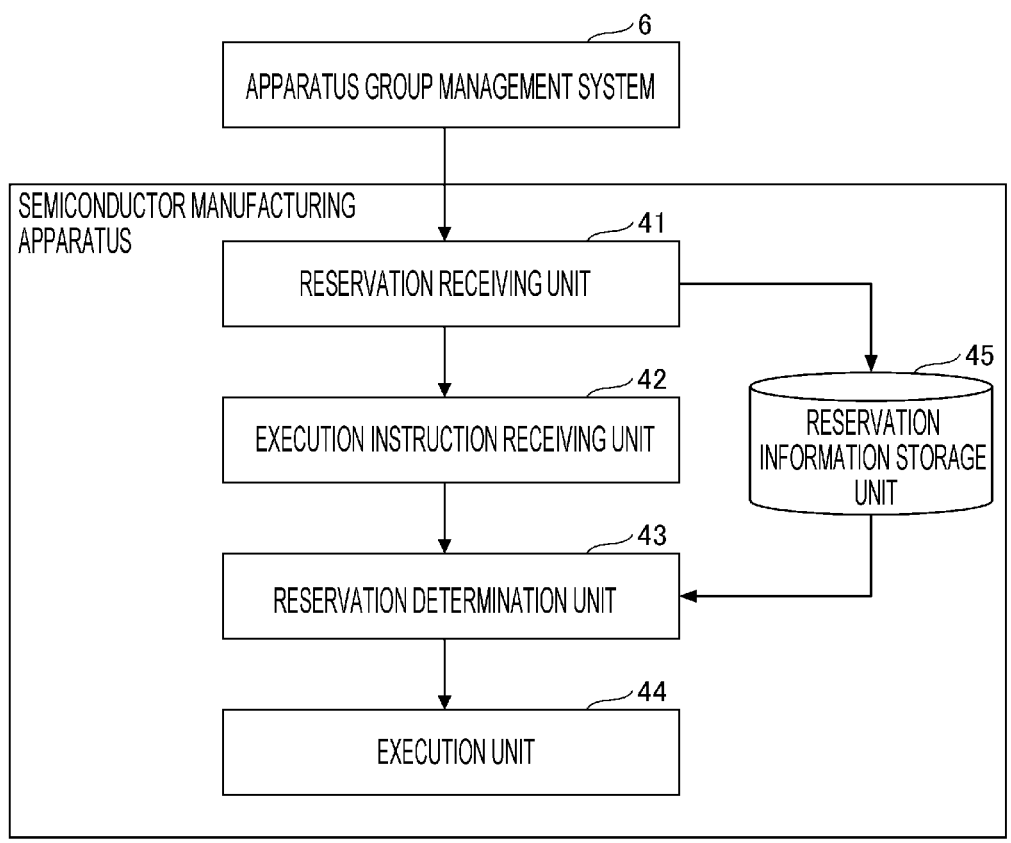
FIG. 12 is a functional configuration diagram illustrating functions of a semiconductor manufacturing apparatus (Embodiment 3).
FIG. 13 is a diagram illustrating an example of reservation information (Embodiment 3).

FIG. 12 is a functional block diagram illustrating functions of the semiconductor manufacturing apparatus 2 of the present embodiment. The semiconductor manufacturing apparatus 2 includes a reservation receiving unit 41, an execution instruction receiving unit 42, a reservation determination unit 43, an execution unit 44, and a reservation information storage unit 45. The functional units of the semiconductor manufacturing apparatus 2 are functions or units that are implemented when the system controller 12 illustrated in FIG. 2 executes instructions included in one or more programs installed in the semiconductor manufacturing apparatus 2.

The reservation receiving unit 41 accepts a shutdown reservation from the apparatus group management system 6 and stores the reservation information in the reservation information storage unit 45.

FIG. 13 is an example of reservation information. In the reservation information, reservation contents are registered with respect to the reservation acceptance date and time. One of the reservation contents is shutdown. The reservation information may be deleted when the content of the reservation is executed, or may be deleted from the oldest reservation information when the reservation information reaches a certain capacity.

Returning to FIG. 12, the execution instruction receiving unit 42 displays a shutdown execution screen on the touch panel display 15 and receives a shutdown instruction from the worker. The shutdown execution screen may be displayed on a display other than the touch panel.

The reservation determination unit 43 determines whether a shutdown has been reserved and a predetermined time has passed since the date and time when the reservation was accepted. When a shutdown has been reserved and a predetermined period of time has not passed since the reservation acceptance date and time, the reservation determination unit 43 requests the execution unit 44 to shut down. Since it may be determined that the semiconductor manufacturing apparatus 2 for which shutdown has been reserved is not the semiconductor manufacturing apparatus 2 that has been erroneously transmitted, it is possible to prevent confusion due to mistransmission.

The function of the execution unit 44 may be the same as that of Embodiment 1.

[Screen Example]

Figure 14A:
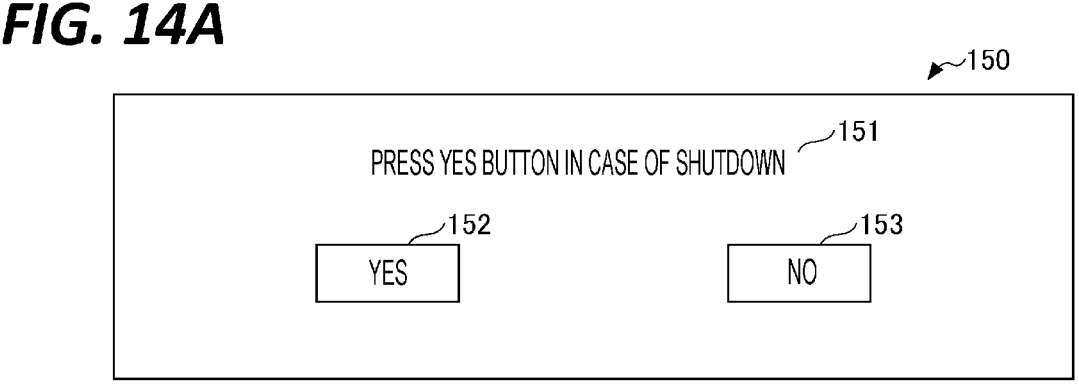
FIGS. 14A and 14B are diagrams illustrating a transition example of a screen displayed on a touch panel display (Embodiment 3).
Figure 14B:
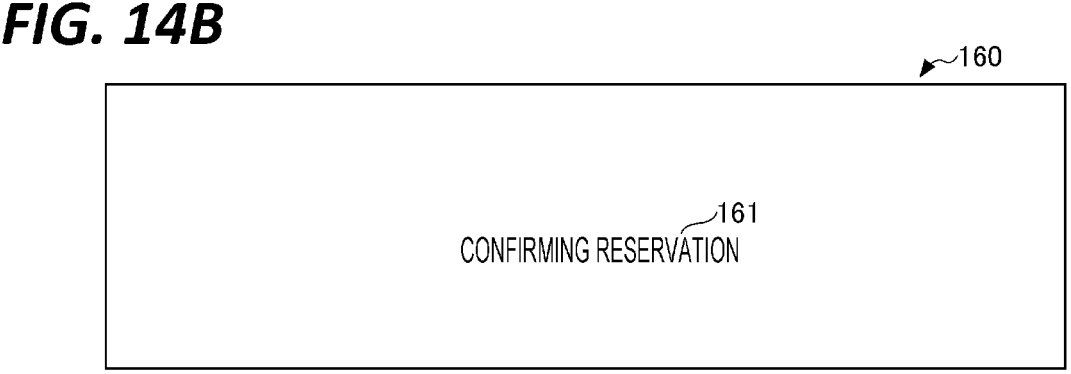

FIGS. 14A and 14B are diagrams illustrating a transition example of the screen displayed on the touch panel display 15 at the time of shutdown. FIG. 14A is an example of a shutdown execution screen 150. The shutdown execution screen 150 of FIG. 14A is the same as that of FIG. 4A. In the present embodiment, when the worker presses the Yes button 152 on the shutdown execution screen 150, execution of shutdown is accepted. The shutdown execution screen 150 transitions to a reservation confirmation screen 160.

FIG. 4B is an example of the reservation confirmation screen 160. The reservation confirmation screen 160 has a message 161 that reads "Confirming reservation."

[Shutdown Procedure]

Figures 15, 16:
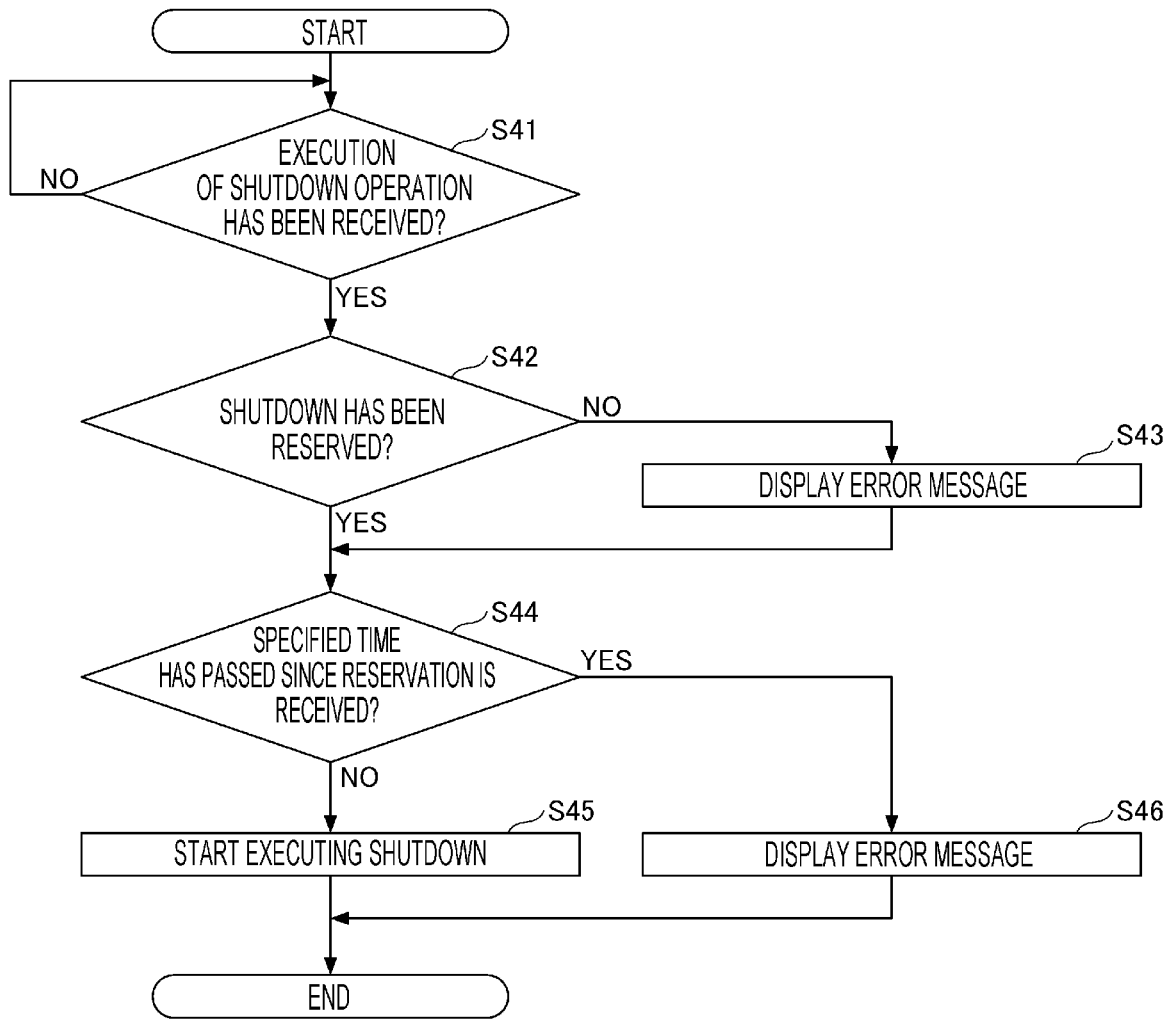
FIG. 15 is a flow chart diagram illustrating a process for shutting down a semiconductor manufacturing apparatus (Embodiment 3).
FIG. 16 is a diagram illustrating an example of reservation information (Modification of Embodiment 3).

FIG. 15 is a flow chart illustrating a process of shutting down the semiconductor manufacturing apparatus 2. Descriptions will be made on a state where the worker displays the shutdown execution screen 100.

First, the execution instruction receiving unit 42 determines whether a shutdown execution instruction has been received (S41). That is, it is determined whether the Yes button 152 has been pressed on the shutdown execution screen 150 of FIG. 14A.

When the determination in step S41 is "Yes," the reservation confirmation screen 160 illustrated in FIG. 14B is displayed, and the reservation determination unit 43 determines whether reservation information regarding shutdown is stored in the reservation information storage unit 45 (S42).

When the determination in step S23 is "No," the execution unit 43 displays an error message on the touch panel display 15 (S43). The error message may be, for example, "Shutdown is not scheduled." In this case, the screen transitions to the main screen or the shutdown execution screen 150.

When the determination in step S42 is "Yes," the reservation determination unit 43 determines whether a predetermined period of time has passed from the reservation acceptance date and time of the reservation information regarding shutdown to the current time (S44).

The predetermined period of time may be, for example, the time necessary for the work, such as several hours to one day. In other words, it is assumed that the administrator reserves the shutdown for the apparatus group management system 6 on the day, and the worker who receives the shutdown instruction from the administrator performs the shutdown work on the same day.

The administrator may wish to reserve the apparatus group management system 6 for shutdown early. For example, the administrator may set a shutdown schedule one week to one month in advance. In this case, the administrator may be able to set a predetermined time as well. For example, when the administrator sets a shutdown reservation one week in advance, the administrator sets a predetermined time for one week and registers the time in the reservation information. A shutdown reservation may be set for the semiconductor manufacturing apparatus 2 by a worker.

When the determination in step S44 is "No," the reservation determination unit 43 displays an error message (S46). The error message may be, for example, "The specified time has passed since the reservation was accepted. Check the semiconductor manufacturing apparatus 2 to be shut down." In this case, the screen transitions to the main screen or the shutdown execution screen 150.

When the determination in step S44 is "Yes," the execution unit 24 starts executing the shutdown of the semiconductor manufacturing apparatus 2 according to the execution instruction (S45).

When the reservation information regarding shutdown is deleted after execution of shutdown, the determination in step S44 may be omitted. However, with the presence of step S44, it is possible to reliably determine the presence or absence of the reservation even when it is not an operation in which the reservation information about the shutdown is deleted after execution of shutdown, or even when the reservation information about the shutdown is not deleted in the operation.

<Modifications>

The administrator may reserve a date and time for the shutdown. In this case, workers may perform the shutdown only at the scheduled date and time.

FIG. 16 is an example of reservation information in the present modification. In the reservation information of FIG. 16, a newly executable date and time is registered. The executable date and time falls within the range of dates and times (starting time and ending time) in which the work of the reservation content may be executed. The semiconductor manufacturing apparatus 2 accepts a shutdown execution instruction when the current time is within the range of this date and time.

Figure 17:
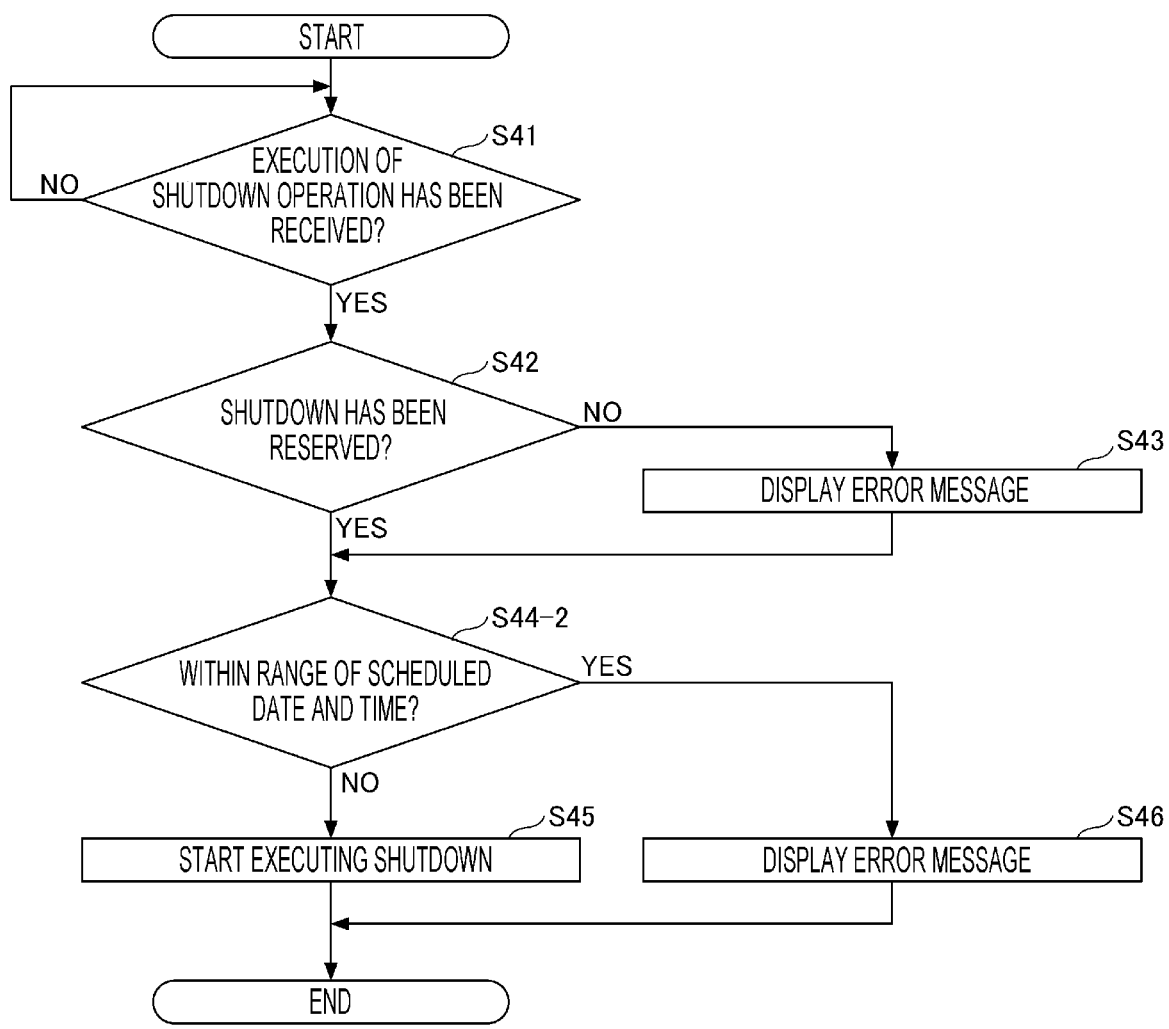
FIG. 17 is a flow chart diagram illustrating a process for shutting down a semiconductor manufacturing apparatus (Modification of Embodiment 3).

FIG. 17 is a flow chart illustrating the process of shutting down the semiconductor manufacturing apparatus 2 in the modification. Descriptions will be made on a state where the worker displays the shutdown execution screen 100. In the description of FIG. 17, mainly the difference from FIG. 15 will be explained.

In FIG. 17, the process of step S44-2 is different. That is, the reservation determination unit 43 determines whether the current time is included in the executable date and time (range of date and time) of the reservation information (S44-2). By doing so, the worker may execute the scheduled shutdown without considering the reservation acceptance date and time.

[Main Effects]

According to the present embodiment, even when the administrator erroneously communicates the target semiconductor manufacturing apparatus 2 when instructing the worker to shut down, it is possible to prevent misunderstandings due to erroneous transmission by confirming that the shutdown has been reserved.

[Others]

For example, Embodiments 1 to 3 may be implemented in combination with all or any two of them. In this way, the present disclosure may further reduce the possibility of erroneously taking the semiconductor manufacturing apparatus 2.

Further, the processing system 1 of FIG. 1 is only an example, and it is also needless to say that there are various system configuration examples depending on the application and purpose. The division of apparatus such as the apparatus group management system 6 and the semiconductor manufacturing apparatus 2 in FIG. 1 is an example.

It is possible to prevent the semiconductor manufacturing apparatus to be operated from being mistaken.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A semiconductor manufacturing apparatus comprising:
an execution instruction receiving circuitry configured to receive an execution instruction for the semiconductor manufacturing apparatus to execute a predetermined process including a shutdown of the semiconductor manufacturing apparatus and related to an operation control of the semiconductor manufacturing apparatus;
an identification information receiving circuitry configured to receive an input of identification information of the semiconductor manufacturing apparatus, the identification information being used for an authentication of the semiconductor manufacturing apparatus; and
an execution circuitry configured to execute the predetermined process according to the execution instruction of the predetermined process when identification information of the semiconductor manufacturing apparatus preset in the semiconductor manufacturing apparatus is same as the identification information of the semiconductor manufacturing apparatus received by the identification information receiving circuitry.

2. A semiconductor manufacturing apparatus comprising:
at least two or more operation receivers including hardware switches and disposed at a predetermined distance or more from each other in the semiconductor manufacturing apparatus that executes a predetermined process including a shutdown of the semiconductor manufacturing apparatus and related to an operation control thereof according to respective operations of the at least two or more operation receivers by at least two or more operators; and
an execution circuitry configured to execute the predetermined process on the semiconductor manufacturing apparatus when detecting that the at least two or more operation receivers including the hardware switches have been operated in an overlapped period by the at least two or more operators, respectively.

3. The semiconductor manufacturing apparatus according to claim 2, further comprising:
an execution instruction receiving circuitry configured to receive an execution instruction of the predetermined process when detecting that the at least two or more operation receivers have been operated in the overlapped time period,
wherein when the execution instruction of the predetermined process is received, the execution instruction receiving circuitry executes the predetermined process.

4. The semiconductor manufacturing apparatus according to claim 2, further comprising:
an execution instruction receiving circuitry configured to receive an execution instruction of the predetermined process related to the operation control of the semiconductor manufacturing apparatus,
wherein when the execution instruction receiving circuitry receives the execution instruction of the predetermined process and further detects that the at least two or more operation receivers have been operated in the overlapped time period, the execution circuitry executes the predetermined process for the semiconductor manufacturing apparatus.

5. A semiconductor manufacturing apparatus comprising:
an execution instruction receiving circuitry configured to receive an execution instruction for the semiconductor manufacturing apparatus to execute a predetermined process including a shutdown of the semiconductor manufacturing apparatus and related to an operation control of the semiconductor manufacturing apparatus;
a reservation information storage configured to store reservation information of the predetermined process, the reservation information including a reservation acceptance date and time, reservation contents provided with the shutdown, an executable date and time of the reservation contents; and
an execution circuitry configured to, when the reservation information is maintained in the reservation information storage, execute the predetermined process on the semiconductor manufacturing apparatus according to the execution instruction of the predetermined process.

6. The semiconductor manufacturing apparatus according to claim 5, wherein when the reservation information is maintained in the reservation information storage and a predetermined time has not passed from the reservation acceptance date and time of the reservation information until the execution instruction receiving circuitry receives the execution instruction of the predetermined process, the execution circuitry executes the predetermined process on the semiconductor manufacturing apparatus.

7. The semiconductor manufacturing apparatus according to claim 5, wherein when the reservation information is maintained in the reservation information storage and the execution instruction receiving circuitry receives the execution instruction of the predetermined process within a range of the executable date and time of the predetermined process registered in the reservation information, the execution circuitry executes the predetermined process on the semiconductor manufacturing apparatus.

8. The semiconductor manufacturing apparatus according to claim 1, wherein the predetermined process includes a restart of the semiconductor manufacturing apparatus.

9. The semiconductor manufacturing apparatus according to claim 8, wherein the restart includes terminating and restarting of a software operating in the semiconductor manufacturing apparatus.

10. The semiconductor manufacturing apparatus according to claim 2, wherein the predetermined process further includes terminating and restarting of a software operating in the semiconductor manufacturing apparatus.

11. The semiconductor manufacturing apparatus according to claim 5, wherein the predetermined process further includes terminating and restarting of a software operating in the semiconductor manufacturing apparatus.

* * * * *